(12) United States Patent
Kunti et al.

(10) Patent No.: US 8,145,608 B2
(45) Date of Patent: Mar. 27, 2012

(54) METHOD AND SYSTEM FOR RAPIDLY PROCESSING AND TRANSPORTING LARGE XML FILES

(75) Inventors: Krishnendu Kunti, West Bengal (IN); Rahul Muralidhar, Mississauga (CA)

(73) Assignee: Infosys Technologies Limited (IN)

( * ) Notice: Subject to any disclaimer, the term of this patent is extended or adjusted under 35 U.S.C. 154(b) by 303 days.

(21) Appl. No.: 12/387,148

(22) Filed: Apr. 28, 2009

(65) Prior Publication Data

US 2009/0307229 A1    Dec. 10, 2009

(30) Foreign Application Priority Data

Apr. 28, 2008  (IN) .......................... 1044/CHE/2008

(51) Int. Cl.
*G06F 17/00* (2006.01)
(52) U.S. Cl. .......................................... 707/694
(58) Field of Classification Search .................. 707/694
See application file for complete search history.

(56) References Cited

U.S. PATENT DOCUMENTS

| | | | |
|---|---|---|---|
| 6,966,027 B1* | 11/2005 | Krasinski | 715/234 |
| 7,210,097 B1* | 4/2007 | Clarke et al. | 715/227 |
| 7,721,202 B2* | 5/2010 | Fuchs et al. | 715/249 |
| 2005/0014494 A1* | 1/2005 | Owen et al. | 455/419 |
| 2009/0077050 A1* | 3/2009 | Breining et al. | 707/4 |

* cited by examiner

*Primary Examiner* — Charles Rones
*Assistant Examiner* — Kurt Mueller
(74) *Attorney, Agent, or Firm* — Lerner, David, Littenberg, Krumholz & Mentlik, LLP

(57) ABSTRACT

A method for rapid processing and transport of large XML files is provided. The method enables splitting an XML file into a plurality of records by a client module. The method further enables parsing each record to obtain a wrapper object. Next, the wrapper object is transported by the client module to a server module. Then, mapping information is populated at the client module based on path information of the wrapper object at the server module. Further, the mapping information is provided from the client module to the server module and records are accessed at the server module using the mapping information.

10 Claims, 7 Drawing Sheets

METHOD AND SYSTEM FOR RAPIDLY PROCESSING AND TRANSPORTING LARGE XML FILES

FIELD OF INVENTION

The present invention relates generally to efficient management of large Extensible Markup Language (XML) files. More particularly, the present invention provides a method and system for rapidly processing and transporting large XML files.

BACKGROUND OF THE INVENTION

Conventionally, technologies such as Simple Object Access Protocol (SOAP) with Attachments (SwA) and File Transfer Protocol (FTP) based applications are used to transport large XML files between systems. Also, parsers such as Streaming Application Programming Interface for XML (StAX) or Document Object Model (DOM) parsers are used to parse the transported XML file. In order to maintain a reasonable performance, the transportation must be coupled with a caching mechanism, as, such large XML files cannot be held in Random Access Memory (RAM) due to its limited capacity in various computing systems. Further, it is also infeasible to parse a large portion of the XML file every time a record or a set of records are needed.

Most of the existing solutions for transporting large XML files between systems are not generic and hence end-users (developers) are not able to re-use code pertaining to the existing solutions. The existing solutions are thus associated with a steep learning curve. This limitation of existing solutions forces a developer to invest valuable time in learning to use a new framework or Application Programming Interface (API) rather than concentrating on implementing business logic.

Consequently, there is need for a generic system and method for transporting large XML files between systems/networks efficiently. There is need for a generic transportation system and method which would allow end-users to fully concentrate on developing business logic and which would completely abstract the end-users from scalability issues, such as, using special data structures to handle extremely large XML files, and the operation of the transportation system itself. Further, there is need for a system and method for transportation of large XML files which is memory efficient and employs an effective caching mechanism.

SUMMARY OF THE INVENTION

A method for rapid processing and transport ("RPT") of large XML files is provided. The method comprises firstly splitting an XML file into a plurality of records by a client module. Secondly, parsing each record to obtain a wrapper object. Next, transporting the wrapper object by the client module to a server module. Then, populating mapping information at the client module based on path information of the wrapper object at the server module. Further, providing the mapping information from the client module to the server module. Finally accessing records using the mapping information at the server module.

In an embodiment of the present invention, the method further comprises obtaining a reference of the XML file from a source. The reference represents path information of the XML file.

In an embodiment of the present invention, parsing each record to create a wrapper object further comprises creating the wrapper object by a user-specific class.

In an embodiment of the present invention, the method further comprises firstly storing the transported wrapper object in a repository at the server module and secondly obtaining the path information of the transported wrapper object.

In an embodiment of the present invention, accessing records using the mapping information at the server module further comprises accessing records employing an interface at the server module by an end-user. The interface is an object to an RPT Array List class.

A system for rapid processing and transport of large XML is provided. The system comprises a client module and a server module. The client module comprises an RPT Agent configured to split an XML file into a plurality of records. The client module further comprises a RPT Parser configured to parse the plurality of records and load a FI Parser to create a wrapper object. Further, the client module comprises a transport manager module configured to transport the wrapper object to the server module. The server module comprises an RPT Array module configured to facilitate access to each record.

In an embodiment of the present invention, the server module further comprises a repository configured to store the wrapper object.

In an embodiment of the present invention, the server module further comprises an object transformation module configured to transform a client-side object retrieved from the wrapper object to a server-side object.

A computer program product comprising a computer usable medium having a computer readable program code embodied therein for rapid processing and transport of large XML files is provided. The computer program product comprises program instruction means for splitting an XML file into a plurality of records by a client module. The computer program product further comprises program instruction means for parsing each record to obtain a wrapper object. Further, the computer program product comprises program instruction means for transporting the wrapper object by the client module to a server module. Furthermore, the computer program product comprises program instruction means for populating mapping information at the client module based on path information of the wrapper object at the server module. The computer program product further comprises program instruction means for providing the mapping information from the client module to the server module and program instruction means for accessing records by using the mapping information at the server module.

In an embodiment of the present invention, the computer program product further comprises program instructions means for obtaining a reference of the XML file from a source, wherein the reference represents path information of the XML file.

In an embodiment of the present invention, the computer program product further comprises program instruction means for storing the transported wrapper object in a repository at the server module and program instructions means for obtaining the path information of the transported wrapper object.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

Figure 1:
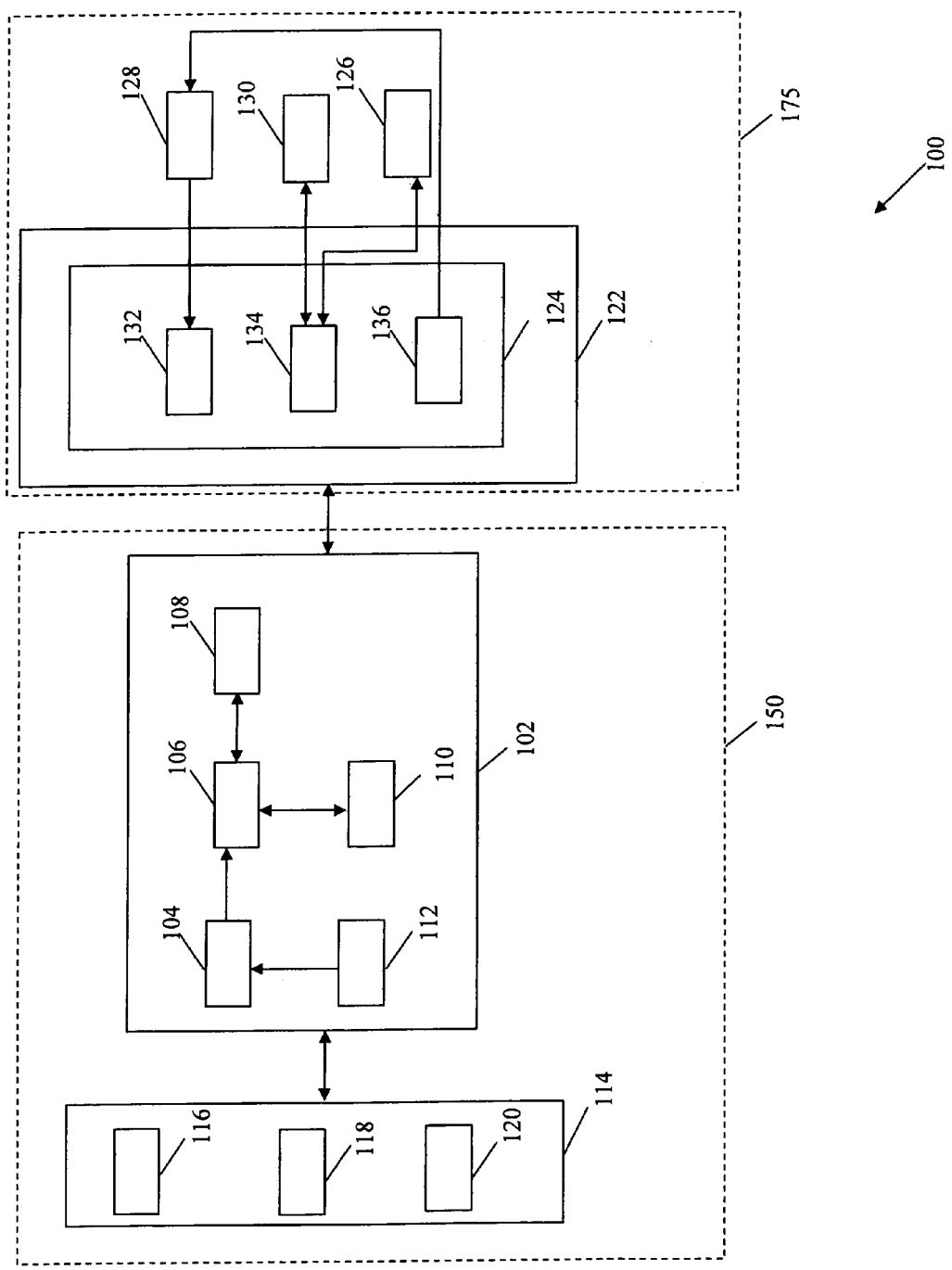
FIG. 1 is a block diagram of a system for rapid processing and transport of large XML files.

A system and method for optimization of processing and transporting of large XML files between systems or networks are described herein. In particular, the invention provides for a system and method that enables rapid processing and transporting of large XML files between systems or networks and efficient exposing of records contained in the XML files in an integrated manner. In various embodiments of the present invention, the system and method employs a combination of Java and XML technologies.

In various embodiments of the present invention, the system described herein broadly comprises two sub-systems which are a client module and a server module. The client module pre-processes raw XML data, contained in the XML file, into record files by employing record-based splitting. Typically, record is an organized collection of related information pertaining to an entity, such as, employees or purchase orders. For example, the XML file can be a large XML file containing hundreds and thousands of employee records. Each employee record contains information designating specifics about the employee, such as name, address, designation etc. Subsequently, the record files/fragments are parsed using a two tier parsing design. In this context, parsing implies translating XML/Binary XML data into java objects that java applications can use, and vice-versa.

In an embodiment, the client module transports the processed XML file to the server module using any suitable communication channel commonly known in the art. The server module stores the processed XML file in any suitable data store mechanism known in the art and exposes the XML file to an end-user by using a two tiered caching approach. Two tier caching approach entails coupling transportation with a caching mechanism, such as file system based caching or relational database management system (RDBMS). This ensures that the entire processed XML data is not held in the memory (i.e. RAM).

In various embodiments of the present invention, the system provides a framework that facilitates an end-user to deal with very large XML files. The end-user may be a developer or any person using the framework. The framework is a pseudo data structure and comprises a client-side framework and a server-side framework. On the server-side, the end-user may use a server side API and access records available to the end-user as a java collection. The API facilitates abstracting all the subsidiary processes required to process, transport and expose the records to the end-user. On the client-side, the end-user may pass a file reference of the XML file to a client side API, which then handles the task of processing, transport and exposing the data to the end-user. This facilitates the end-user to write services using familiar data structures such as lists, without contemplating about scalability issue of the service. For example, the service may be processing of large employee records. Thus, use of complicated algorithms and data structures to deal with extremely large XML file may be eliminated and the end-user can focus on implementing business logic efficiently.

Further, the framework is generic as it is designed to handle very large XML files independent of specific data, for example, structure of any particular object that is transported and processed. In various embodiments of the present invention, the framework is capable of working with objects of classes describing any entity such as employees or purchase orders. Since the framework is independent of structure of any particular object that is transported and processed, the system of the present invention can be used in a wide variety of situations without any modifications. This prevents a code written by an end-user for a particular application program, using the framework, from breaking when the object evolves.

The following disclosure is provided in order to enable a person having ordinary skill in the art to practice the invention. Exemplary embodiments are provided only for illustrative purposes and various modifications will be readily apparent to persons skilled in the art. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The present invention would now be discussed in context of embodiments as illustrated in the accompanying drawings.

FIG. 1 is a block diagram illustrating a system 100 for rapid processing and transport of large XML files in accordance with an embodiment of the present invention. The system 100 comprises a client-side framework 150 and a server-side framework 175. The client-side framework 150 further comprises a client module 102 and end-user artifacts 114.

The Client module 102 comprises a RPT Agent 104, a RPT Parser 106, a RPT Configuration Loader Module 108, a transport manager module 110 and a client receiver module 112. Client module 102 is coupled with the end-user artifacts 114. The end-user artifacts comprise a client application 116, a RPT Configuration File 118 and a FI Parser 120. In an embodiment of the present invention, the client module 102 may be developed using the end-user artifacts 114.

RPT Agent 104 is a software module that acts as the entry point for the end-user to use the client-side framework 150. In an embodiment of the present invention, the RPT Agent 104 is a class which the end-user uses to instantiate an object to use the client-side framework 150. The RPT Agent 104 controls and co-ordinates all operations of the client module 102. For example, the RPT Agent 104 controls and coordinates the operation of the RPT Parser 106 that parses an XML file to obtain an object and create a wrapper object. In particular, the RPT Agent 104 facilitates splitting of the XML file into smaller fragments, i.e. into records and also controls and coordinates the operation of the RPT Parser 106 to parse the records and create a wrapper object. The RPT Agent 104 further controls and coordinates the movement of a copy of a serializing class file to a server-side framework. The serializing class file contains serialized wrapper object and java class files of custom entities (e.g. employees). Further, the RPT Agent 104 controls and coordinates the operation of populating a configuration bean. A configuration bean may be defined as a reusable program building block that represents configuration information required for the operation of the server-side framework. In an embodiment of the present invention, the RPT Agent 104 controls and coordinates the operation of the configuration bean to send the configuration information across to the server-side framework 175.

In addition, the RPT Agent 104 controls and coordinates the operations of the transport manager module 110 and the client receiver module 112. In an embodiment of the present invention, the RPT Agent 104 stores mapping information received from the client receiver module 112 in a database. Furthermore, the RPT Agent 104 controls and coordinates the operation of collecting statistics for measuring the framework performance; cleaning up before exiting client module operations; and handling all exceptions thrown by various system components, and exposing only an instance of RPT Exception to an end-user. RPT Exception wraps an exception, along with additional information that makes it easier to determine the cause of the error.

RPT Parser 106 is a software module that translates an XML file into objects. In an embodiment of the present invention, the RPT Parser 106 translates 'Fast Infoset' file into java objects that java applications can use and vice-versa. 'Fast Infoset' is a binary XML format specification. Binary XML describes an encoding of XML data in a binary data format rather than in plain-text. 'Fast Infoset' is a specification for binary encoding of XML that reduces the size of the file and facilitates improved processing (e.g. serialization and deserialization) of the objects for transportation to the server-side framework 175. In an embodiment of the present invention, the RPT Parser 106 may be a StAX parser used to parse the XML file into java objects.

The RPT Parser 106 parses the XML file into objects and creates wrapper objects using a two tier parsing design. Wrapper objects are pre-sized lists of individual record objects obtained by parsing the XML file. Wrapper objects are used in order to abstract the framework from the record objects that requires to be transported. The two tier parsing design facilitates the RPT Parser 106 to control the parsing and delegate object creation to a FI Parser. The FI Parser is an instance of a user-specific class that is generated by a code generation engine along with the end-user artifacts 114 using an appropriate web service's Web Service Description Language (WSDL) file.

This design enables the end-user to control the object creation to modify the FI Parser class and the object creation is shielded from the framework. At the same time, the framework may shield its internal mechanics, like the creation of wrapper objects, from the end-user. This design enables the RPT Parser 106 to operate independent of XML schema and facilitates a framework without any entity-specific dependencies.

RPT Configuration Loader module 108 is a software module that loads all configuration information required for the operation of the system into memory (i.e. RAM) upon start up of the system. The RPT Configuration Loader module 108 also loads few frequently re-used classes on start-up. In an embodiment of the present invention, the RPT Configuration Loader module 108 operates in conjunction with the RPT Configuration file 118 to obtain the configuration information required for the operation of the system. The RPT Configuration Loader module 108 facilitates the operations to be performed only once.

Transport manager module 110 is a software module that facilitates transport of the wrapper object to and from the client module 102. The transport manager module 110 is a swappable transport interface which accommodates use of different transport strategies in different situations. In order to abstract non-transport processes from transport-centric processes, the transport manager module 110 is used internally by non-transport processes, thereby making the system of the present invention functionally unchangeable, regardless of the transport mechanism used. Examples of transport mechanism may comprise Java Messaging Services (JMS) and SwA. In an embodiment of the present invention, the JMS based default implementation is hosted remotely. The JMS based transport mechanism is used to move serialized fragments across to a server module where the fragments are stored. JMS is a reliable messaging mechanism, and is typically used where reliability is a concern (e.g. intranets). SwA is an open protocol, and may be useful in cases where modules are to be re-used.

In various embodiments of the present invention, the transport mechanism can be coupled with a variety of protocols, such as Transfer Control Protocol (TCP) and Hyper Text Transport Protocol (HTTP). HTTP may be used in systems that have to communicate past organization firewalls.

Client receiver module 112 is a software module that acts as an interface for the client-side framework 150 to receive information from the server-side framework 175. In an embodiment of the present invention, the client receiver module 112 is configured to receive information returned by the server-side framework 175 and populate server side file-to-data/file-to-key mapping object in a database, using data returned by the server-side framework. The file-to-key mapping object maybe a collection class, such as, an ArrayList. In an embodiment of the present invention, the database may be a relational database management system.

Client application 116 is a software module/client written by an end-user. In various embodiments of the present invention, the client application 116 is written by using stubs. Stubs may be defined as a piece of code that is used for writing the client application 116. In an embodiment of the present invention, stubs are generated when RPT Build Script is run on a web service's WSDL using an ANT Build Script. ANT Build Script is a java-based build tool.

RPT Configuration file 118 comprises all the configuration information required by the system. In an exemplary embodiment of the present invention, RPT Configuration file 118 defines properties that contain all the configuration information required for the framework. The properties fields include baseDir which is a base directory to generate files to; pkgName which is a name of the package the user-specific parser is a part of; rptToolClassPath which is an absolute path to RPTTools.jar; RPTToolHome which is an absolute path for the distribution; wsdlURI which is a URI of the WSDL of the service for which code is to be generated; topLevelTag which is a XML Tag of top-most parent of entity object(s); topLevelClassFQN which is a fully qualified name of top-most parent; wrapperLimit which is a maximum size of each wrapper object; rptSharedClassPath which is an absolute path to RPTGenShared.jar; and JMSBrokerURI which is a URI of a JMS Broker to connect to persistenceMode.

FI Parser 120 is a user-specific class which is generated by running RPT Build Script with ANT Build Script. In an embodiment of the present invention, the FI Parser 120 is generated along with the stubs used for writing the client application 116. This class is responsible for creating an object, and passing the created object back to the RPT Parser 106, which is in control of the parsing.

The server-side framework 175 further comprises a server module 122 that comprises RPT Array module 124, RPT Class Loader module 126, web service module 128 and a repository 130. RPT Array Module 124 comprises a key-index resolving module 132, a deserializer 134 and an object transformation module 136.

RPT Array module 124 is a software module that facilitates the end-user to access the records that are transported by the client module 102. In an embodiment of the present invention, the RPT Array module 124 is a class which is used by an end-user to instantiate an object to access the records that are transported from the client module 102. In various embodiments of the present invention, the RPT Array module 124 exposes data (i.e. wrapper object) that is transported from the client module 102 to the server module 122 and stored in the server module 122, as a read only ArrayList.

Key-index resolving module 132 is a software module that facilitates loading of an appropriate file, containing serialized wrapper object, into the memory to retrieve a required record. In an embodiment of the present invention, when an index based call is made for accessing a particular record in the XML file, the key-Index resolving module 132 is configured to calculate key from the index to determine which file, containing a serialized wrapper object, is to be loaded into the memory to retrieve the particular record.

Deserializer 134 is a software module that de-serializes a serialized file that contains wrapper object. In an embodiment of the present invention, the deserializer 134 deserializes the serialized wrapper object that is stored in the server module 122. Subsequently, the deserializer 134 makes the wrapper object available in the memory to derive a object that corresponds to a record that is to be accessed. The derived objects are client-side objects that are transported from the client module 102.

Object transformation module 136 is a software module that transforms the object, resulting from deserialization of the serialized/deflated wrapper object, into a server-side equivalent object/server-side object. The deserialized object is an object to the client-side record class. Typically, the objects obtained subsequent to deserialization cannot be used by the server module 122, as they are recognized as distinct classes by, for example, a Java Virtual Machine (JVM), hence such objects need to be transformed. JVM is a set of computer software programs and data structure that use a virtual machine for execution of other computer programs and scripts. In an embodiment of the present invention, the object transformation module 136 is implemented using Dozer API which is an open source java bean mapping framework.

RPT Class Loader module 126 is a software module that manages loading classes that facilitates deserialization of the serialized wrapper objects stored in a suitable data store mechanism in the server module 122. These classes correspond to serializing classes sent by the RPT Agent 104, along with the serialized wrapper objects. In various embodiments of the present invention, the serializing classes correspond to the java class files of the custom entities (e.g. employee class). This is so, as the serialized client-side wrapper objects transported and stored in the server module 122 can be deserialized and transformed into server-side objects only if the same client-side entity classes are available. Else, an error message i.e. ClassCastException may be provided. This is so, as there is an inherent incompatibility between the client-side entity objects and the service side entity objects.

Web service module 128 facilitates use of the framework for accessing data sent by clients. The clients host the client module 102. In various embodiments of the present invention, the web services module 128 may comprise a SOAP Engine along with various APIs and tools to facilitate the deployment and invocation of web services and exposing of an end user's business logic as a web service. In one embodiment of the present invention, the web service module may include, but are not limited to, Codehaus, XFire and Apache Axis2.

Repository 130 is used to store the serialized/deflated wrapper objects that are transported from the client module 102 to the server module 122. In one embodiment of the present invention, the repository 130 may include any relational database, such as, Oracle, SQL, etc.

In various embodiments of the present invention, the server module 122 further comprises a RPT Code Generation tool which generates all the required end-user artifacts and stubs. In one embodiment of the present invention, the RPT Code Generation tool is implemented in the form of an ANT Build Script, and uses a modified version of WSDL2JAVA tool packaged with Apache Axis2. The RPT Code Generation tool facilitates the end-user to write applications in accordance with a service oriented design paradigm to facilitate interoperability. Further, the classes generated by the RPT Code Generation tool may have additional information to assist with subsidiary processes such as data binding.

Figure 2:
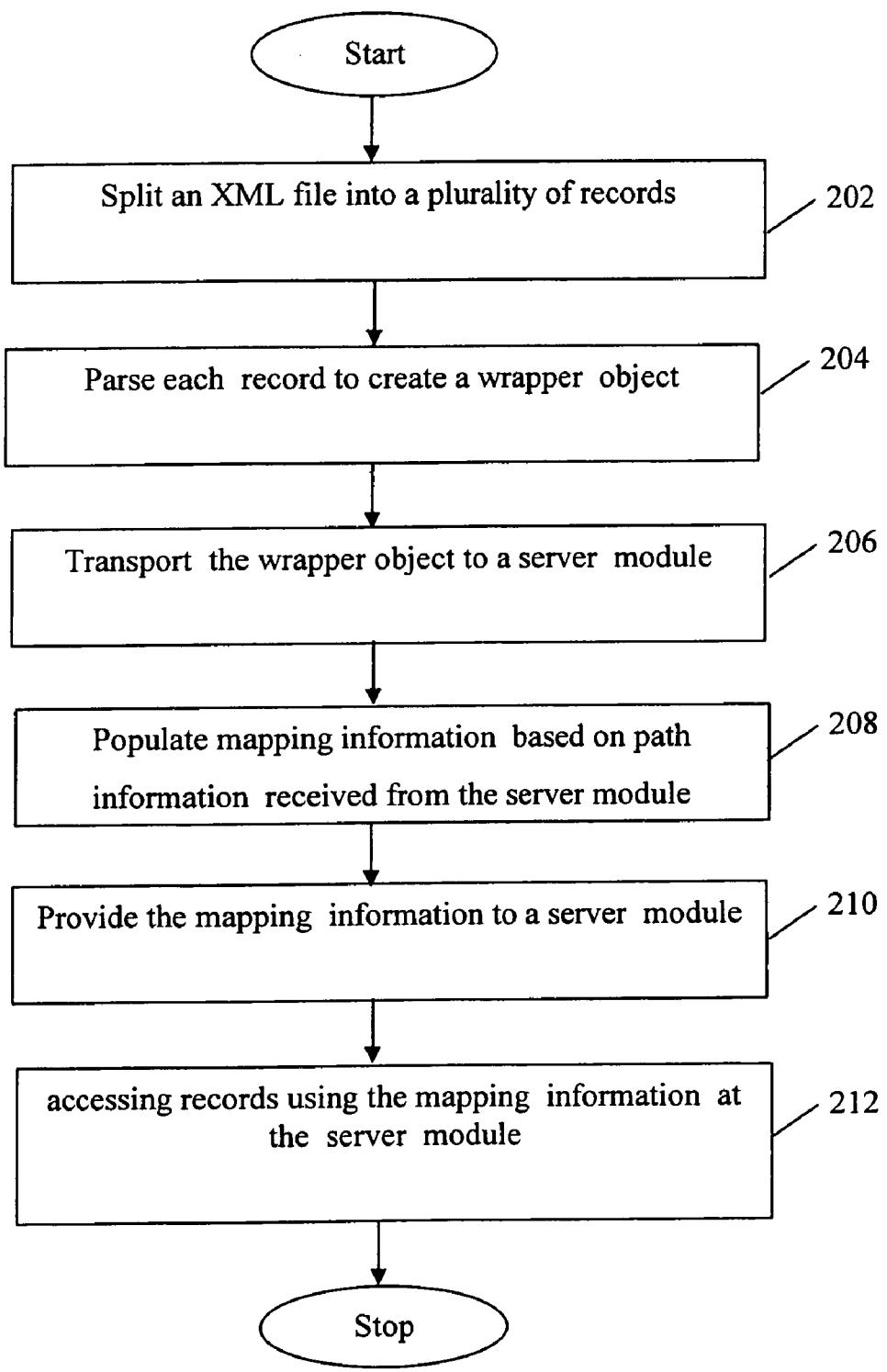
FIG. 2 is a flowchart illustrating a method of processing and transporting large XML files in accordance with an embodiment of the present invention.

FIG. 2 is a flowchart illustrating a method of processing and transporting large XML files in accordance with an embodiment of the present invention.

At step 202 an XML file is split into a plurality of records by a client module. In various embodiments of the present invention, XML file is a large file having hundreds and thousands of employee records. The large XML file is divided into smaller, yet logically split fragments.

At step 204 the plurality of records are parsed to create wrapper objects. In an embodiment of the present invention, records are parsed to obtain java objects and are added to a wrapper object until it reaches a pre-defined size limit.

At step 206 the wrapper object is transported by the client module to a server module. In various embodiments of the present invention, the created wrapper object is firstly converted to a format suitable for transportation across a network i.e. the wrapper object is serialized. In another embodiment of the present invention, serialized wrapper object is transported to the server module where it is stored in a repository.

At step 208 mapping information is populated by the client module in a database based on path information received from the server module. In various embodiments of the present invention, the path information corresponds to an absolute path of the serialized wrapper object and a file-level mapping of the wrapper object is populated in the database. In an embodiment of the present invention, the database may be any relational database such as SQL, Oracle etc.

At step 210, the mapping information is provided to the server module. At step 212 the records are accessed using the mapping information at the server module.

In various embodiments of the present invention, the mapping information is provided to the server module once all records contained in the XML file have been processed and transported. In another embodiment of the present invention, the mapping information is returned to a web service that is making a request for accessing the records. The web service passes the mapping information from the client module to the server module. In various embodiments of the present invention, the web service accesses each record using at least the mapping information through an object created at the server module.

In an embodiment of the present invention, when an index-based (individual record) web service call is made for accessing a record, using the mapping information in conjunction with a mathematical algorithm, the appropriate wrapper object is located and loaded from a repository into memory (i.e. RAM). The required object is retrieved from the wrapper. The object is a client-side object that is transformed into the server-side object using an object transformation module. The server-side object is returned to the calling web service. The web-service, thus, accesses the required record.

In various embodiments of the present invention, the method further comprises obtaining a reference to the XML file from a source. The reference may be path information of the XML file. The reference is obtained in any suitable encoding format known in the art.

Figure 3:
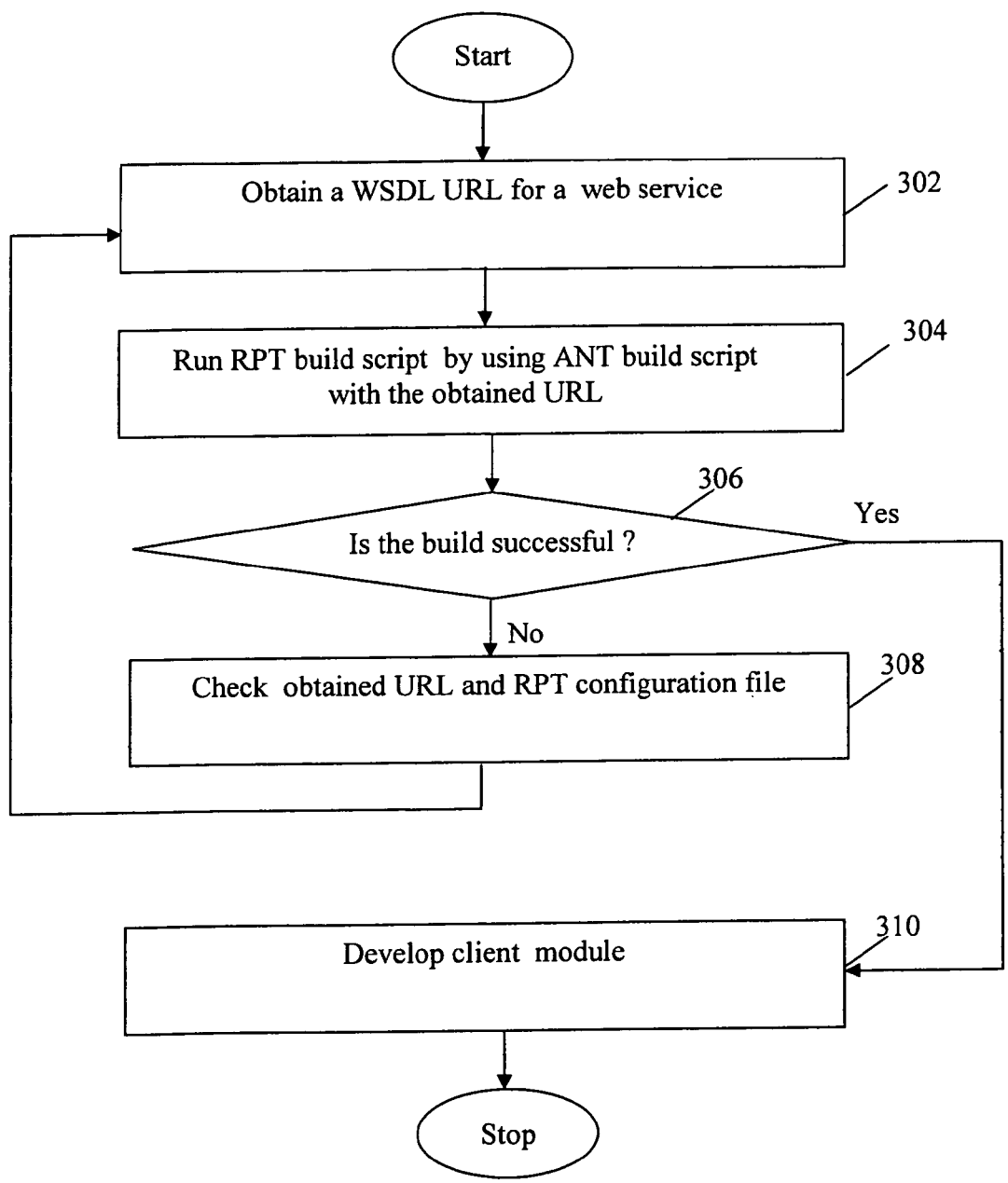
FIG. 3 is a flowchart illustrating a method of generating stubs using RPT Code Generation tool for developing a client module, in accordance with an embodiment of the present invention.

FIG. 3 is a flowchart illustrating a method of generating stubs using the RPT Code Generation tool, in accordance with an embodiment of the present invention.

At step 302 a WSDL URL for a web service is obtained. At step 304 the RPT build script is run by using ANT build script with the obtained URL as the target. At step 306 it is determined if the build has been successful. At step 308 if the build has been successful, a client module may be developed. At step 310 if the build has not been successful the obtained URL and RPT configuration files are checked for any errors and steps 302 to 306 are repeated.

Figure 4A:
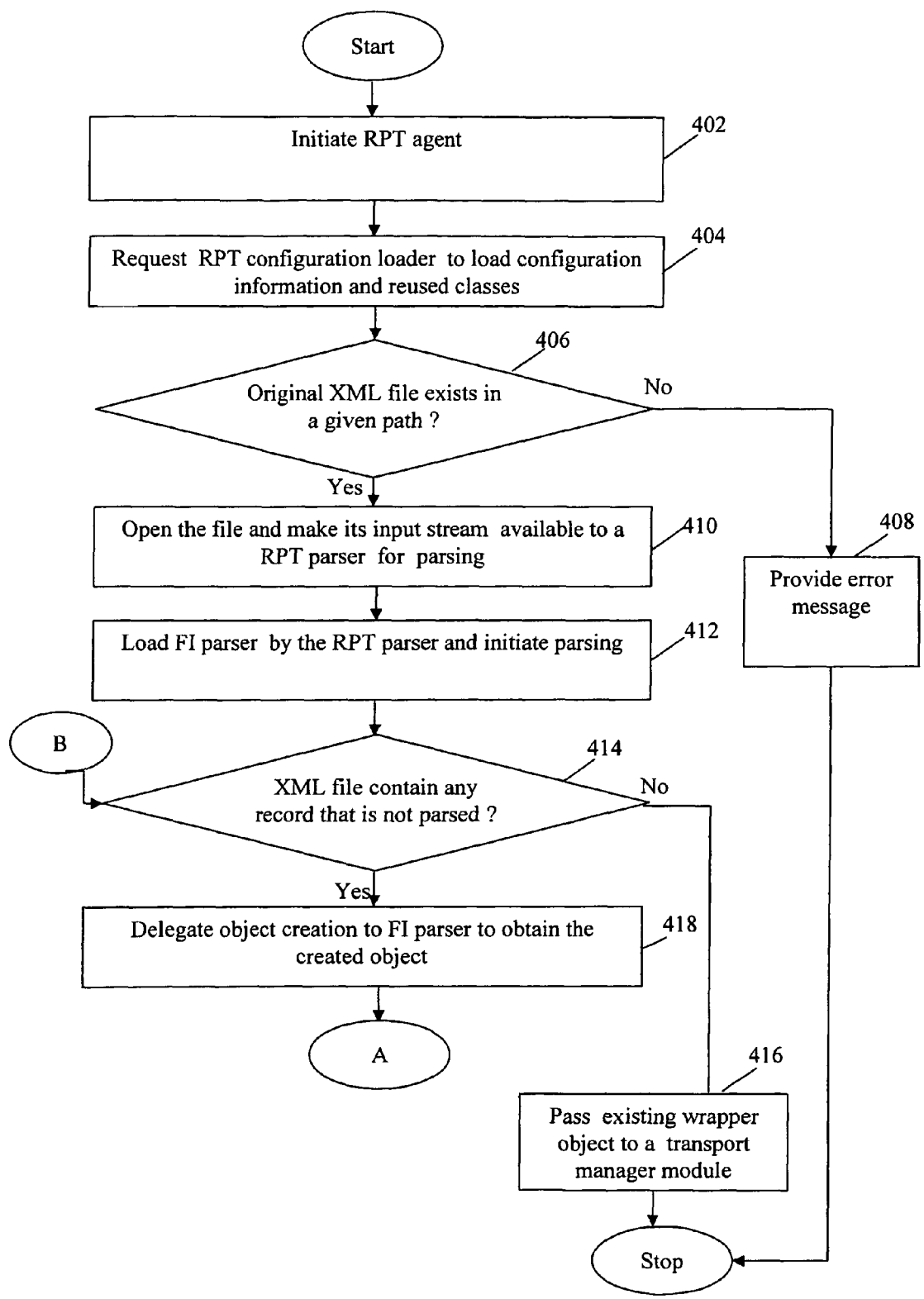
FIG. 4 is a flowchart illustrating a process for transporting large XML files carried out by a client module, in accordance with an embodiment of the present invention.
Figure 4B:
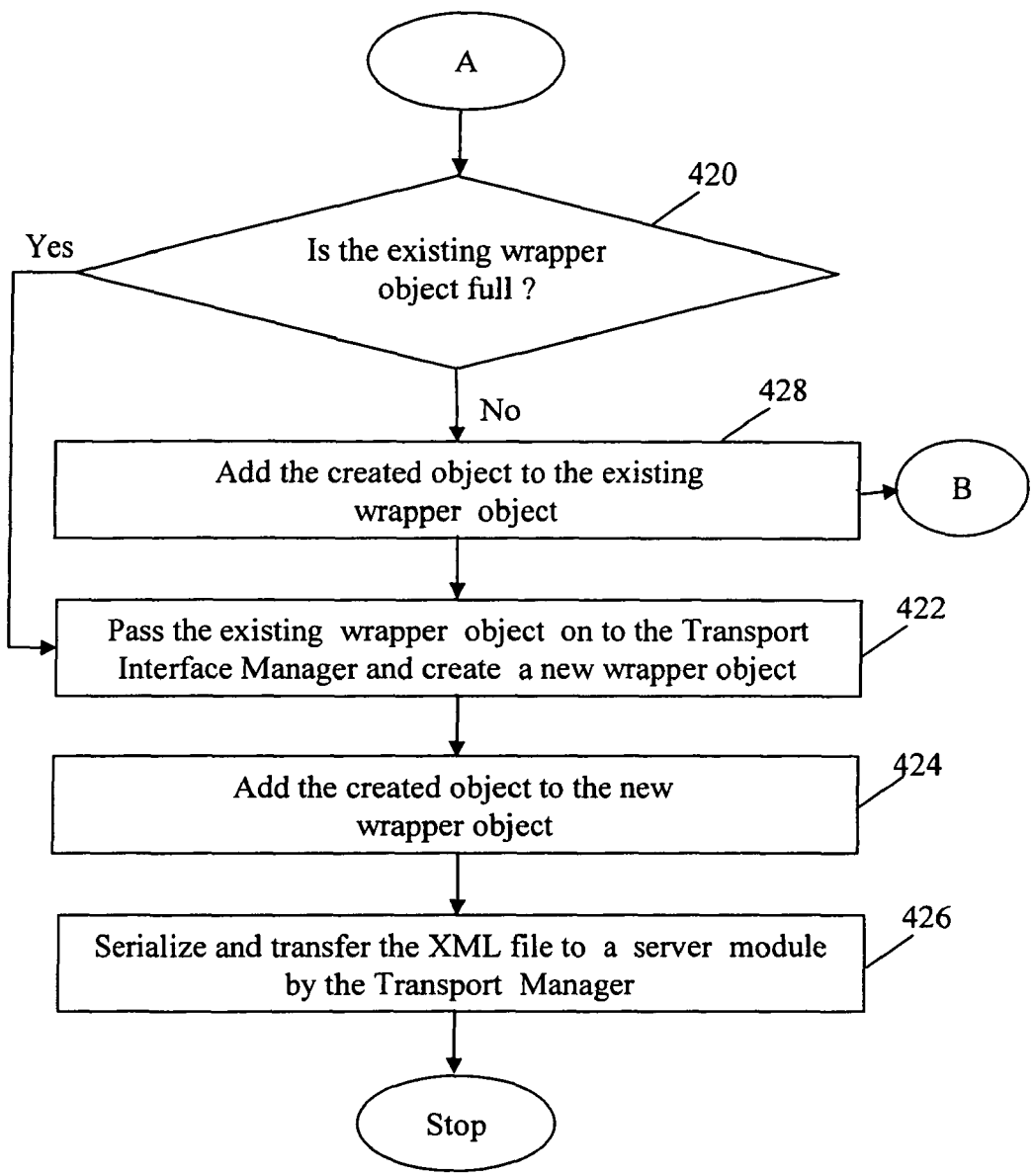

FIG. 4 is a flowchart illustrating a process for rapid processing and transporting of large XML files carried out by a client module, in accordance with an embodiment of the present invention.

At step 402 an RPT agent is initiated. In various embodiments of the present invention, the step 402 commences when end-user creates a web service client i.e. the client module and then the client module initializes an object to the RPT agent class with requisite parameters. At step 404 a RPT Configuration Loader module is requested to load configuration information and reused classes. At step 406 it is determined if an original XML file exists in a given path. At step 408 if it is determined that the original XML file does not exist in a given path, an error message is provided. The error message may be an RPTException. At step 410 if it is determined that the original XML file exists in a given path, the file is opened and its input stream is made available to a RPT parser for parsing. In various embodiments of the present invention, the RPT parser obtains parser class and properties for parsing from the RPT Configuration Loader module. At step 412 FI parser is loaded by the RPT parser and parsing is initiated. The FI parser is a custom object creation class/user specific class. At step 414 it is determined if the XML file contains any record that has not been parsed. At step 416 if it is determined that all the records contained in the XML file have been parsed, the existing wrapper object is passed on to a transport manager module.

At step 418 if it is determined that the XML file contains any record that has not been parsed, object creation is delegated to FI parser and the created object is obtained. At step 420 it is determined if the existing wrapper object is full. At step 422 if it is determined that the existing wrapper object is full the existing wrapper object is passed on to the transport manager module and a new wrapper object is created. At step 424 the created object is added to the new wrapper object. At step 426 the XML file is serialized by the Transport Manager and transferred to a server module. At step 428 if it is determined that the existing wrapper object is not full the created object is added to the existing wrapper object and steps 414 onwards are repeated.

Figure 5:
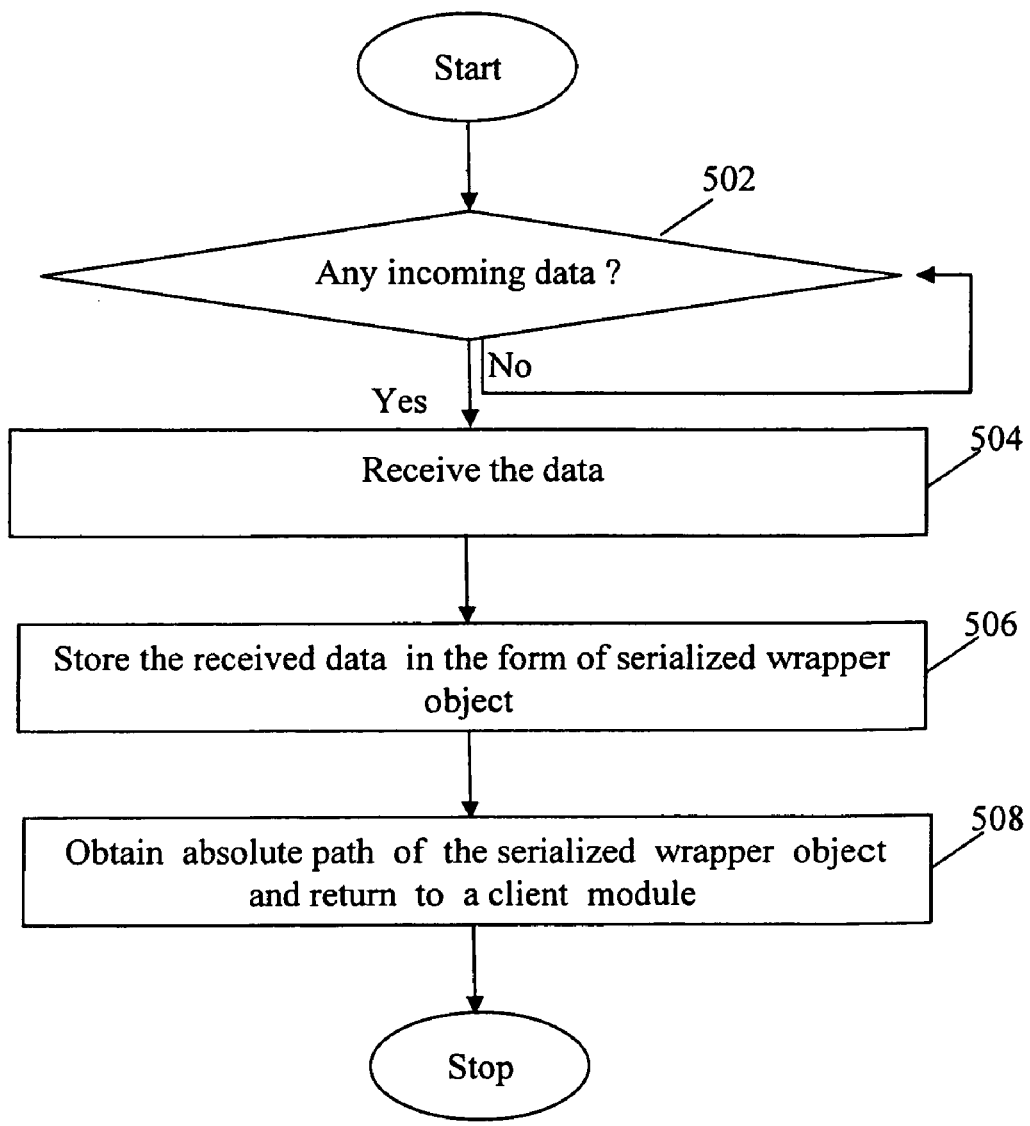
FIG. 5 is a flowchart illustrating a process for transporting large XML files carried out by a server module, in accordance with an embodiment of the present invention.

FIG. 5 is a flowchart illustrating a process for rapid processing and transporting of large XML file carried out by a server module, in accordance with an embodiment of the present invention. At step 502 it is periodically determined if an incoming data is received from a client module. At step 504 if it is determined that incoming data is received from the client module, the received data is processed if required. At step 506 the received data in the form of serialized wrapper object is stored in a repository. At step 508 absolute path of the serialized wrapper file is obtained and returned to the client module.

In various embodiments of the present invention, the client module receives information regarding the absolute path of the serialized wrapper file from the server module and populates mapping information in a database in the client module asynchronously. In an embodiment of the present invention, the mapping information may be returned by an RPT Agent in the client module to a web service that is making a request for accessing the records. In various embodiments of the present invention, the mapping information may be returned as a collection (i.e. an array list) containing the server-side file-to-key mapping information.

Figure 6:
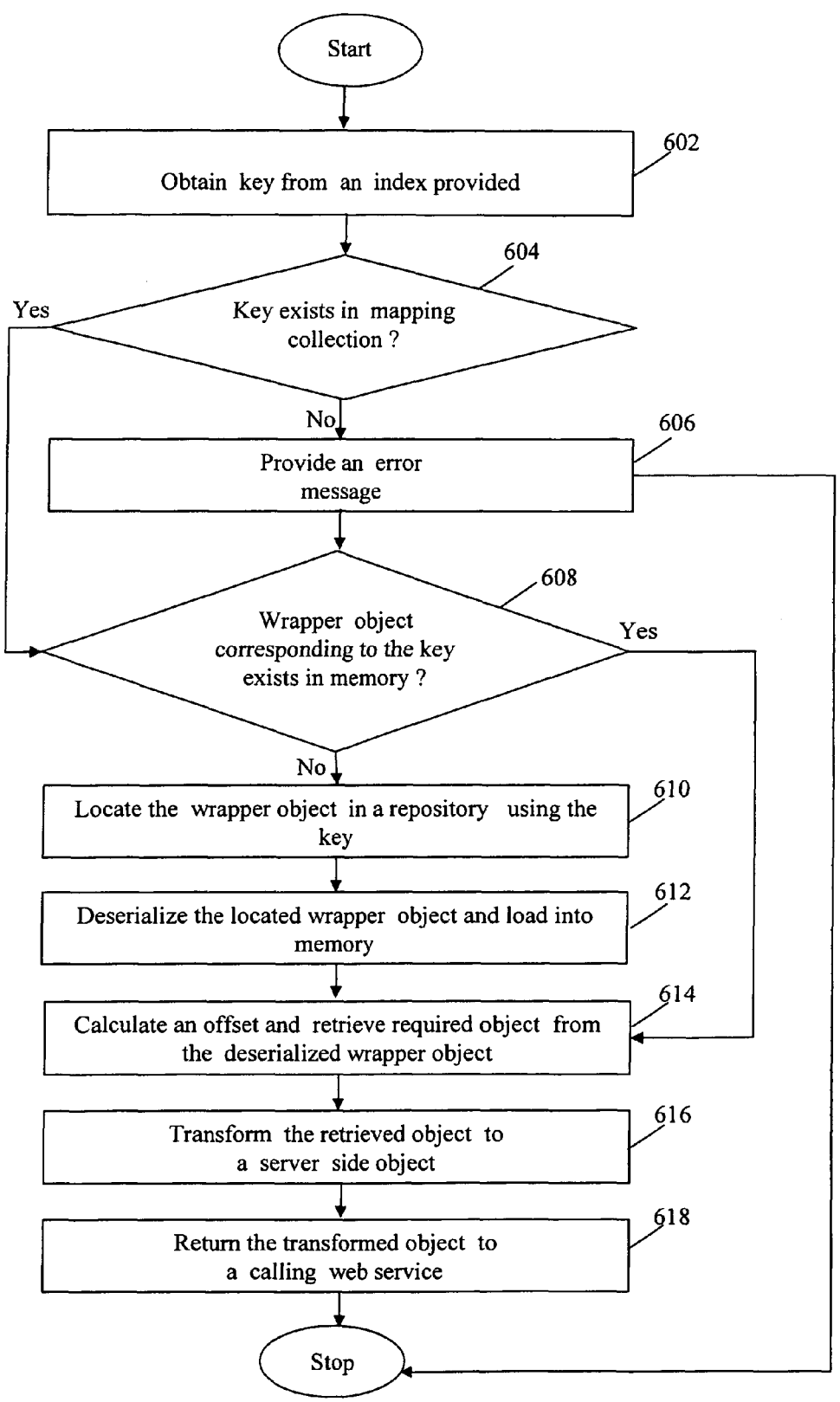
FIG. 6 is a flowchart illustrating a process for retrieving a record from a large XML file in accordance with an embodiment of the present invention.

FIG. 6 is a flowchart illustrating a process for retrieving a record from a large XML file in accordance with an embodiment of the present invention.

At step 602 a key is obtained from an index provided. In various embodiments of the present invention, an end-user makes a request to access a record from a large XML file. The request is an index based request where the index corresponds to the record. The index further comprises key information for opening the record.

At step 604 it is checked if the key exists in a mapping collection. In an embodiment of the present invention, the mapping collection is an array list containing the server-side file-to-key mapping information. In various embodiments of the present invention, the mapping collection is populated in a database in a client module and is made available to an RPT Array module as a first constructor argument. In another embodiment of the present invention, the mapping information may be made available to the end-user by the RPT Agent. Subsequently, the end-user passes the mapping information to a server module as a second constructor argument to the RPT Array module. Alternatively, a mechanism can be used where the RPT Array module can automatically retrieve the mapping information from a repository of mapping information. The mapping information may be retrieved from a shared repository based on a tag or identifier number.

At step 606 if it is determined that the key does not exist in a mapping collection, an error message is provided. The error message may be an RPTException stating 'array index out of bounds'.

At step 608 if it is determined that the key exists in a mapping collection, it is determined if a wrapper object corresponding to the key exists in memory. At step 610 if it is determined that a wrapper object corresponding to the key does not exist in the memory the wrapper object is located in a repository at the server module by using the key. In an embodiment of the present invention, the wrapper object is located by obtaining a serializing wrapper object file from the repository as a byte array. The serializing wrapper object is transported from the client module and stored in the repository.

At step 612 the located wrapper object is deserialized and loaded into the memory by a deserializer and a RPT Class Loader module. In various embodiments of the present invention, this step comprises obtaining a file stored in the repository to deserialize the wrapper object. Further, the serializing class stored in the RPT Class Loader module is used to deserialise the wrapper object. Furthermore, the deserializing class is loaded into the RPT Class Loader module.

At step 614 if it is determined that a wrapper object corresponding to the key exists in memory an offset is calculated and the required object is retrieved from the deserialized list. At step 616 the retrieved object is converted to a server-side object by an object transformation module. In various embodiments of the present invention, the server-side API obtains server-side parent entity class (e.g. employee class) as a second argument to a constructor for obtaining the transformed server-side object. As discussed previously, the entity classes are typically java class files of all custom entities (e.g. employee class files) that are sent along with the serialized wrapper objects by the client module and loaded by the RPT Class Loader module in the server module.

At step 618 the transformed object is returned to a calling web service. In various embodiments of the present invention, calling web service is a request which an end-user is making to access a record. In an embodiment of the present invention, the transformed server-side object is populated with data from the deserialized client-side object. Thus, the present invention allows end-users to have full access to all the data, regardless of the size of the data set, in the form of an easy to use simple-looking data structure, such as a list. This allows the end-user to develop business logic without having to worry about the actual volume of data that requires handling.

Furthermore, the system and method of the present invention provide for minimal memory utilization regardless of the size of the original file as only a portion of the data is actually loaded into the memory (i.e. RAM) at any given time, whilst the rest resides on a repository as serialized lists that can be efficiently loaded into RAM on demand. By using RAM efficiently, the other processes running on the system can operate normally.

Advantageously, the system and method described in the present invention combine the two tasks of transporting and processing large XML file into a single, well orchestrated and efficient process. The system and method of the present invention further provides a mechanism to expose the transported and processed data i.e. records in the XML file to the end-user in the form of a simple list. This enables the end service-developer to focus on implementing business logic without having to worry about handling large XML files. Furthermore, the mapping mechanism described in the present invention eliminates the requirement to reconstitute the split XML file.

The present invention may be implemented in numerous ways including as a system, method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various changes in form and detail may be made therein without departing from or offending the spirit and scope of the invention.

We claim:

1. A method for rapid processing and transport of XML files across a network, the method comprising the steps of:
   splitting an XML file into a plurality of records by a client module;
   creating a plurality of wrapper objects having a pre-defined size limit, parsing the plurality of records and storing the parsed records in the plurality of wrapper objects, wherein creating the plurality of wrapper objects and parsing and storing the plurality of records comprises the steps of:
   (i) creating a record object corresponding to each record, each record object comprising an instance of a user-defined class, wherein structure of the user-defined class corresponds to structure of the records of the XML file; and
   (ii) adding record objects to a wrapper object up to its pre-defined size limit, wherein the wrapper object provides an abstracted framework for assembling records parsed from the XML file;
   serializing the wrapper objects;
   transporting the wrapper objects across the network by the client module to a server module;
   transporting a user-defined class file corresponding to the user-defined class across the network by the client module to the server module;
   populating mapping information at the client module based on path information of the wrapper objects at the server module;
   providing the mapping information from the client module to the server module; and
   accessing records by using the mapping information and the user-defined class file at the server module.

2. The method of claim 1 further comprising obtaining a reference of the XML file from a source, wherein the reference represents path information of the XML file.

3. The method of claim 1 further comprising:
   storing the transported wrapper object in a repository at the server module; and
   obtaining the path information of the transported wrapper objects.

4. The method of claim 1 wherein the step of accessing records using the mapping information at the server module further comprises:
   accessing records employing an interface at the server module by an end-user, the interface being an object of a collection class.

5. A system for rapid processing and transport of XML files across a network, the system comprising:
   a client module comprising:
      an agent configured to split an XML file into a plurality of records;
      a first parser configured to parse the plurality of records, to load a second parser, to create a plurality of wrapper objects having a pre-defined size limit by adding record objects received from the second parser up to the pre-defined size limit, and to serialize the plurality of wrapper objects, wherein the wrapper objects provide an abstracted framework for assembling records parsed from the XML file; and
      a transport manager module configured to transport the wrapper objects and a user-defined class file corresponding to the user-defined class across the network to a server module;
      the second parser configured to create a record object corresponding to each of the plurality of records parsed by a rapid processing and transport parser, each record object comprising an instance of a user-defined class wherein structure of the user-defined class corresponds to structure of the records of the XML file; and
   the server module comprising
      a collection class configured to facilitate access to each record through an instance of the user-defined class file received by the server module; and
      at least one processor coupled with at least one memory, wherein the at least one processor is configured to execute the functions of the client module, the transport manager module and the server module.

6. The system of claim 5, wherein the server module further comprises a repository configured to store wrapper objects.

7. The system of claim 5, where the server module further comprises an object transformation module configured to transform a client-side object retrieved from a wrapper object to a server-side object.

8. A computer program product comprising a non-transitory computer usable medium having a computer readable program code embodied therein for rapid processing and transport of XML files across a network, the computer program product comprising:

program instructions for splitting an XML file into a plurality of records by a client module;

program instructions for creating a plurality of wrapper objects having a pre-defined size limit, parsing the plurality of records and storing the parsed records in the plurality of wrapper objects, wherein creating the plurality of wrapper objects and parsing and storing the plurality of records comprises the steps of:
  (i) creating a record object corresponding to each record, each record object comprising an instance of a user-defined class, wherein structure of the user-defined class corresponds to structure of the records of the XML file; and
  (ii) adding record objects to a wrapper object up to its pre-defined size limit, wherein the wrapper object provides an abstracted framework for assembling records parsed from the XML file;

program instructions for serializing the wrapper objects;

program instructions for transporting the wrapper objects across the network by the client module to a server module;

program instructions for transporting a user-defined class file corresponding to the user-defined class across the network by the client module to the server module;

program instructions for populating mapping information at the client module based on path information of the wrapper objects at the server module;

program instructions for providing the mapping information from the client module to the server module; and program instructions for accessing records by using the mapping information and the user-defined class file at the server module.

9. The computer program product of claim 8 further comprising program instructions for obtaining a reference of the XML file from a source, wherein the reference represents path information of the XML file.

10. The computer program product of claim 8 further comprising:

program instructions for storing the transported wrapper objects in a repository at the server module; and program instructions for obtaining the path information of the transported wrapper object.

* * * * *